United St

Fancher

E Re. 28,496

Reissued July 29, 1975

[54] CINNAMYL CARBAMATES

[75] Inventor: Llewellyn W. Fancher, Orinda, Calif.

[73] Assignee: Stauffer Chemical Company, Westport, Conn.

[22] Filed: Nov. 16, 1972

[21] Appl. No.: 307,259

Related U.S. Patent Documents

Reissue of:

[64] Patent No.: 3,697,582
Issued: Oct. 10, 1972
Appl. No.: 719,700
Filed: Apr. 8, 1968

[52] U.S. Cl. ..... 260/482 C; 71/70; 71/106; 71/111; 265/304.5; 260/463; 260/471 C

[51] Int. Cl. ..... C07c 25/06

[58] Field of Search ..... 260/482 C

[56] References Cited

FOREIGN PATENTS OR APPLICATIONS

| | | | |
|---|---|---|---|
| 554,576 | 3/1958 | Canada | 260/482 |
| 837,718 | 6/1960 | United Kingdom | 260/482 |
| 374,980 | 3/1964 | Switzerland | 260/482 |
| 6,403,519 | 10/1964 | Netherlands | 260/482 |

*Primary Examiner*—Anton H. Sutto
*Assistant Examiner*—Paul J. Killos
*Attorney, Agent, or Firm*—Harry A. Pacini; Daniel C. Block; Edwin H. Baker

[57] ABSTRACT

Compounds correspond to the formula

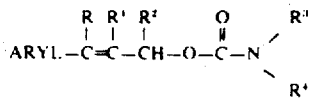

wherein ARYL is phenyl, substituted phenyl, naphthyl and substituted naphthyl in which said substituents are halogen, lower alkoxy, lower alkyl, or when ARYL is substituted phenyl the substituent is also 3,4-oriented-methylenedioxy;

R and $R^1$ are independently hydrogen, lower alkyl, chlorine or bromine; $R^2$ is hydrogen, lower alkyl, or phenyl; and $R^3$ and $R^4$ are independently hydrogen, alkyl, lower alkenyl, carbethoxymethyl, phenyl and substituted phenyl in which said substituents are selected from the group halogen, lower alkoxy, lower alkyl and nitro, provided that only one of $R^3$ or $R^4$ is phenyl or substituted phenyl. The above-defined compounds are effective herbicides. Representative compounds are: cinnamyl-N-methylcarbamate; 2-chlorocinnamyl-N-methylcarbamate; cinnamyl-N-allylcarbamate; cinnamyl carbamate; o-bromocinnamyl-N-methyl carbamate.

12 Claims, No Drawings

CINNAMYL CARBAMATES

Matter enclosed in heavy brackets [ ] appears in the original patent but forms no part of this reissue specification; matter printed in italics indicates the additions made by reissue.

---

This invention relates to certain new compounds and their utility as active herbicidal substances. In particular, this invention pertains to certain novel cinnamyl carbamates corresponding to the general formula:

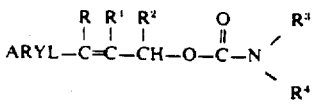

in which ARYL is selected from the group consisting of phenyl, naphthyl, substituted phenyl and substituted naphthyl in which said substituents are selected from the group consisting of halogen, lower alkoxy, lower alkyl, and provided that when ARYL is substituted phenyl the substituent is also 3,4-oriented-methylenedioxy; R and $R^1$ are independently selected from the group consisting of hydrogen, lower alkyl, chlorine and bromine; $R^2$ is selected from the group consisting of hydrogen, lower alkyl and phenyl; and $R^3$ and $R^4$ are independently selected from the group consisting of hydrogen, alkyl, lower alkenyl, carbethoxymethyl, phenyl and substituted phenyl in which said substituents are selected from the group halogen, lower alkoxy, lower alkyl and nitro, provided that only one of $R^3$ or $R^4$ is phenyl or substituted phenyl and further provided that when ARYL is phenyl, then $R^3$ or $R^4$ is not phenyl. Among the active herbicidally effective compounds are included those compounds in which ARYL is phenyl and $R^3$ or $R^4$ is phenyl.

In the above description the following preferred embodiments are intended for the various groups; lower alkyl preferably includes those members which contain from one to about four carbon atoms, inclusive, in both straight chain and branched chain configurations, for example, methyl, ethyl, n-propyl, isopropyl, n-butyl, sec-butyl, and the like; lower alkoxy preferably includes those members which contain from one to about four carbon atoms, inclusive, in both straight chain and branched chain configurations, for example, methoxy, ethoxy, n-propoxy, isopropoxy, n-butoxy, sec-butoxy and the like; alkyl preferably includes those members which contain from one to about eight carbon atoms, inclusive, in both straight chain and branched chain configurations, for example, methyl, ethyl, n-propyl, isopropyl, n-butyl, sec-butyl, amyl, isoamyl, n-hexyl, iso-hexyl, n-heptyl, n-octyl, iso-octyl and the like; lower alkenyl preferably includes those members of the group containing at least one double bond and containing from two to four carbon atoms, inclusive, for example, vinyl, allyl, propenyl, 1-butenyl, 2-butenyl, 3-butenyl and the like; and the term halogen preferably includes fluorine, chlorine, bromine and iodine.

As a consequence of the special geometry of the carbon-carbon double bond and restricted rotation about this bond, the possibility exists in the compounds of the present invention of geometric isomerism. Cis-trans isomerism is very frequently encountered in this type of structure containing a carbon-carbon double bond. It is recognized that the trans isomers are usually more stable than the corresponding cis isomers. The existence of both stereoisomeric forms is believed to exist for the majority of the compounds described herein. The compounds of the present invention are not limited to any specific geometric isomer configuration. In several instances, as seen below, both stereo isomers have been isolated and characterized. The physical properties of cis and trans isomers are usually quite similar and separation of both from a mixture by techniques such as fractional distillation or crystallization is not always possible.

The method of the present invention of controlling undesirable plants comprises applying an herbicidally effective amount of the above-described compounds to the area where control is desired. An herbicide is used herein to mean a compound which controls or modifies the growth of plants. By an "herbicidally effective amount" is meant an amount of compound which causes a modifying effect upon the growth of plants. Such modifying effects include all deviations from natural development, for example, killing, retardation, defoliation, desiccation, regulation, stunting, tillering, stimulation, dwarfing and the like. By "plants" it is meant germinant seeds, emerging seedlings, and established vegetation including the roots and above-ground portions.

The compounds of the present invention can be prepared by employing several different methods. In each method the appropriate cinnamyl alcohol is employed in a condensation reaction according to one of the following methods:

(1)

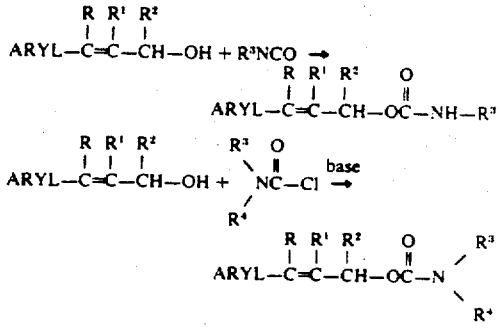

(2)

(3a)

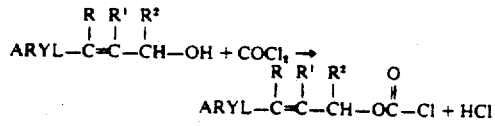

(3b)

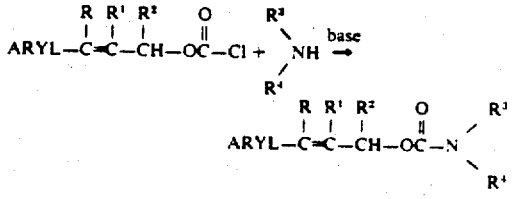

in which ARYL, R, $R^1$, $R^2$, $R^3$ and $R^4$ are defined as above.

The intermediate cinnamyl-type alcohols are easily prepared according to the method taught in U.S. Pat. No. 3,094,561. This method comprises the condensation of an appropriate arylaldehyde with acetaldehyde or homolog thereof in the presence of potassium hydroxide and ethanol to yield a cinnamaldehyde-type compound. This aldehyde is then reduced using aluminum iso-propoxide to form the cinnamyl alcohol-type compound. The reactions (1), (2) and (3a,b) proceed readily in the liquid phase. The employment of a solvent is useful in facilitating processing as well as agitation of the reactants. Suitable solvents are benzene, chlorobenzene, toluene and the like. Where the reaction employs an isocyanate, Equation (1) supra, it is preferred to carry out the reaction in the presence of a catalyst, such as, dibutyltindilaurate. When a basic halogen halide acceptor is preferred as the catalyst, as in reactions (2) and (3a), supra, sodium carbonate or preferably tertiary amines, such as triethylamine, pyridine, picoline and the like are chiefly employed.

The reaction temperatures are varied within a fairly wide range. The process is carried out between 0° and 180° C. preferably between about 10° C. and 100° C. Temperatures are maintained which allow operation in the liquid phase.

Compounds of the present invention are prepared by the following illustrative examples.

EXAMPLE 1

Preparation of Cinnamyl-N-methyl-carbamate

Sixty-seven grams (0.5M) of cinnamyl alcohol is dissolved in 100 ml. of benzene. To this solution is added 3 drops of dibutyl-tindilaurate and 30.2 g. (0.53M) (40.5 ml.) of methyliso-cyanate. The initial exothermic reaction is controlled by heating or cooling so that the temperature remained below 55° C. The reaction is completed by refluxing the mixture for one hour. The bulk of the solvent is evaporated and the solid product crystallized from cyclohexane. There is obtained 96.2g. of the title compound, m.p. 57°–63+63°C. The structure is confirmed by infrared spectroscopy.

EXAMPLE 2

Preparation of Cinnamyl-N,N-dimethyl-carbamate

Cinnamyl alcohol 16.1 g. (0.12M) is dissolved in 25 cc. of pyridine. The mixture is cooled to 10° and N,N-dimethyl-carbamyl chloride 15.1 g. (0.14M) (13.4 ml.) is added with stirring below 20° C. When the mixture is warmed to 35° C., a mild exothermic reaction was evidenced by a temperature rise to 54° C. After heating on a steam bath for an additional 2.5 hours, the mixture is allowed to stand at ambient temperature overnight. The product is taken up in chloroform and washed successively with water, cold dilute HCl and again with water. The chloroform is dried over anhydrous $MgSO_4$, filtered and the chloroform removed in vacuo. There is obtained 21.4g. (87 per cent of theory) of a light colored liquid product, the title compound, $n_D^{30}$ 1.5482. The structure is confirmed by infrared spectroscopy.

The following is a table of the compounds which are prepared according to the procedures set forth above. Compound numbers have been assigned to them and are employed for identification through the balance of the specification:

TABLE I

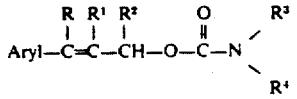

| Compound number | Aryl | R | R¹ | R² | R³ | R⁴ | M.P. or $n_D^{30}$ |
|---|---|---|---|---|---|---|---|
| 1 | Phenyl | H | H | H | H | Methyl | 57–63°C. |
| 2 | " | H | H | H | H | Ethyl | 1.5450 |
| 3 | " | H | H | H | H | Allyl | 1.5510 |
| 4 | " | H | H | H | H | p-Cl-phenyl – | 107–110°C. |
| 5 | " | H | H | H | H | Phenyl – | 1.6084 |
| 6 | " | H | H | H | H | n-Butyl | 46–48°C. |
| 7 | " | H | H | Methyl | H | Methyl | 1.5787 |
| 8 | " | H | H | H | H | o-$CH_3O$-phenyl | 1.5956 |
| 9 | " | H | Methyl | H | H | Methyl | 58–63°C. |
| 10 | " | H | " | H | H | Phenyl | 75–78°C. |
| 11 | " | H | H | H | H | p-$CH_3$-phenyl | 84–86°C. |
| 12 | " | H | Methyl | H | H | Ethyl | 1.5621 |
| 13 | " | H | H | Methyl | H | Phenyl | 1.6092 |
| 14 | " | H | H | H | Methyl | Methyl | 1.5482 |
| 15 | " | H | H | H | Ethyl | Ethyl | 1.5232 |
| 16 | " | H | H | H | Allyl | Allyl | 1.5159 |
| 17 | " | H | H | H | H | 2,5-$Cl_2$-phenyl | 78–81°C. |
| 18 | " | H | H | H | H | n-Octyl | 35–38°C. |
| 19 | " | H | H | H | H | n-$C_3H_7$ | 47–49°C. |
| 20 | " | H | H | H | H | i-$C_3H_7$ | 75–78°C. |
| 21 | " | H | H | H | H | -$CH_2C(O)OEt$ | 60–63°C. |
| 22 | " | H | H | H | H | m-$NO_2$-phenyl | 92–95°C. |
| 23 | p-Cl-phenyl | H | H | H | H | Methyl | 105–107°C. |
| 24 | " | H | H | H | H | " | 56–59°C. |
| 25 | " | H | H | H | Methyl | " | 1.5671 |
| 26 | 2,4-$Cl_2$-phenyl | H | H | H | " | " | 1.5808 |
| 27 | " | H | H | H | H | " | 84–87°C |
| 28 | 3,4-$Cl_2$-phenyl | H | H | H | H | " | 75–78°C. |
| 29 | 3,4-$Cl_2$- | H | H | H | Methyl | " | 1.5793 |
| 30 | O-$NO_2$-phenyl | H | H | H | H | " | 62–66°C. |
| 31 | " | H | H | H | Methyl | " | 1.5695 |
| 32* | Phenyl | H | H | H | H | " | 1.5482 |
| 33** | " | H | H | H | Methyl | " | 1.5503 |
| 34 | m-Cl-phenyl | H | H | H | H | " | 57–61°C. |
| 35 | Phenyl | H | H | H | H | H | 119–121°C. |
| 36 | o-Br-phenyl | H | H | H | H | Methyl | 65–67°C. |
| 37 | 3,4-methylenedioxyphenyl | H | H | Methyl | H | " | 1.5712 |
| 38 | " | H | H | " | H | Phenyl | 1.5900 |
| 39 | " | H | H | " | Methyl | Methyl | 1.5832 |
| 40 | Phenyl | H | H | H | H | t-$C_4H_9$ | 1.5290 |
| 41 | 4-$CH_3O$-phenyl | H | H | H | H | Methyl | 84–86°C |
| 42 | 2-$CH_3O$-phenyl | H | H | H | H | " | 1.5458 |

TABLE I-Continued

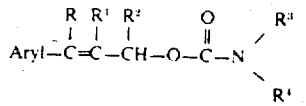

| Compound number | Aryl | R | R¹ | R² | R³ | R⁴ | M.P. or $n_D^{20}$ |
|---|---|---|---|---|---|---|---|
| 43 | 2-$CH_3O$-phenyl | H | H | H | H | " | 1.5469 |
| 44 | 2,6-$Cl_2$-phenyl | H | H | H | H | " | " |
| 45 | 4-$CH_3$-phenyl | H | H | H | H | " | 102–103°C. |
| 46 | 1-naphthyl | H | H | H | H | " | 1.5852 |
| 47 | Phenyl | H | Bromine | H | H | " | 42–45°C. |
| 48 | " | H | " | H | H | Phenyl | 90–93°C. |
| 49 | " | Bromine | H | H | H | Methyl | 1.5493 |
| 50 | " | " | H | H | H | Phenyl | 1.5690 |
| 51 | o-$CH_3$-phenyl | H | H | H | H | Methyl | 1.5450 |
| 52 | m-$Cl_3$-phenyl | H | H | Methyl | H | " | 1.5603 |
| 53 | α-Cl-naphthyl | H | H | H | Methyl | " | |
| 54 | α-Br-naphthyl | H | H | Methyl | H | " | |
| 55 | β-$CH_3O$-naphthyl | H | H | " | Methyl | " | |
| 56 | β-n-$C_4H_9O$-naphthyl | H | Methyl | H | H | " | |
| 57 | β-$CH_3$-naphthyl | H | Chlorine | H | Methyl | " | |
| 58 | β-n-$C_4H_9$-naphthyl | Chlorine | H | H | H | " | |
| 59 | β-F-naphthyl | Methyl | H | Ethyl | Methyl | " | |
| 60 | Phenyl | Chlorine | n-$C_4H_9$ | Phenyl | H | Allyl | |
| 61 | 4-n-$C_4H_9O$-phenyl | Bromine | H | Methyl | H | Methyl | |
| 62 | 4-F-phenyl | n-butyl | H | H | H | " | |
| 63 | 4-I-phenyl | H | Bromine | H | Methyl | Ethyl | |
| 64 | 4-$CH_3$-phenyl | Methyl | H | n-Butyl | H | n-Butyl | |
| 65 | 3,4-$Cl_2$-phenyl | n-Butyl | H | Phenyl | H | Isopropyl | |
| 66 | o-$NO_2$-phenyl | Chlorine | H | Methyl | Allyl | Allyl | |

*Cis-isomer of Compound No. 1.
**Cis-isomer of Compound No. 14.
[1]Waxy solid.

Herbicidal Screening Tests

As previously mentioned, the herein described compounds produced in the above-described manner are phytotoxic compounds which are useful and valuable in controlling various plant species. Compounds of this invention are tested as herbicides in the following manner.

Pre-emergence herbicide test. On the day preceding treatment, seeds of seven different weed species are planted in individual rows using one species per row across the width of the flat. The seeds used are hairy crabgrass (Digitaria sanguinalis (L.) Scop.), yellow foxtail (Setaria glauca (L.) Beauv.), watergrass (Echinochloa crusgalli (L.) Beauv.), California red oat (Avena sativa (L.)), redroot pigweed (Amaranthus retroflexus (L.), Indian mustard (Brassica juncea (L.) Coss.) and curly dock (Rumex crispus (L.). Ample seeds are planted to give about 20 to 50 seedlings per row, after emergence, depending on the size of the plants. The flats are watered after planting. The spraying solution is prepared by dissolving 50 mg. of the test compound in 3 ml. of a solvent such as acetone containing 1% Tween 20 (polyoxy-ethylene sorbitan monolaurate). The following day each flat is sprayed at the rate of 20 pounds of the candidate compound per 80 gallons of solution per acre. An atomizer is used to spray the solution on soil surface. The flats are placed in a greenhouse at 80° F. and watered regularly. Two weeks later the degree of weed control is determined by comparing the amount of germination and growth of each weed in the treated flats with weeds in several untreated control flats. The rating system is as follows:

−= no significant injury (0–15 per cent control)
+= slight injury (25–35 per cent control)
++= moderate injury (55–65 per cent control)
+++=severe injury or death (85–100 per cent control)

An activity index is used to represent the total activity on all seven weed species. It is the sum of the number of plus marks, so that an activity index of 21 represents complete control of all seven weeds. The results of this test are reported in Table II.

Post-emergence herbicide test. Seeds of five weed species including hairy crabgrass, watergrass, California red oats, Indian mustard, and curly dock and one crop, pinto beans (Phaseolus vulgaris), are planted in flats as described above for pre-emergence screening. The flats are placed in the greenhouse at 72°–85°F. and watered daily with a sprinkler. About 10 to 14 days after planting when the primary leaves of the bean plant are almost fully expanded and the first trifoliate leaves are just starting to form, the plants are sprayed. The spray is prepared by weighing out 50 mg. of the test compound, dissolving it in 5 ml. of acetone containing 1% Tween 20 (polyoxy-ethylene sorbitan monolaurate) and then adding 5 ml. of water. The solution is sprayed on the foliage using an atomizer. The spray concentration is 0.5 percent and the rate would be approximately 20 lb/acre if all of the spray were retained on the plant and the soil, but some spray is lost so it is estimated that the application rate is approximately 12.5 lb/acre.

Beans are used to detect defoliants and plant growth regulators. The beans are trimmed to two or three plants per flat by cutting off the excess weaker plants several days before treatment. The treated plants are placed back in the greenhouse and care is taken to avoid sprinkling the treated foliage with water for three days after treatment. Water is appiled to the soil by means of a slow stream from a watering hose taking care not to wet the foliage.

Injury rates are recorded 14 days after treatment. The rating system is the same as described above for the preemergence test where (−), (+), (++), and (+++) are used for the different rates of injury and control. The injury symptoms are also recorded. The maximum activity index for complete control of all the species in the post-emergence screening test is 18 which represents the sum of the plus marks obtained with the six plant species used in the test. The herbicide activity index is shown in Table II.

TABLE II

| Compound Number | Herbicidal Acitvity Screening Results Herbicidal Activity Index** Pre-emergence (20lb/A) | Post-emergence (12.5 lb/A) |
|---|---|---|
| 1 | 21 | 18 |
| 2 | 15 | 15 |
| 3 | 14 | 18 |
| 4 | 0 | 3 |
| 5 | 11 | 9 |
| 6 | 13 | 13 |
| 7 | 0 | 11 |
| 8 | 3 | 7 |
| 9 | 15 | 16 |
| 10 | 6 | 7 |
| 11 | 6 | 12 |
| 12 | 6 | 13 |
| 13 | 5 | 10 |
| 14 | 3 | 14 |
| 15 | 0 | 9 |
| 16 | 3 | 2 |
| 17 | 0 | 4 |
| 18 | 0 | 2 |
| 19 | 16 | 13 |
| 20 | 16 | 10 |
| 21 | 3 | 1 |
| 22 | 0 | 3 |
| 23 | 13 | 12 |
| 24 | 21 | 18 |
| 25 | 0 | 9 |
| 26 | 7 | 15 |
| 27 | 8 | 10 |
| 28 | 8 | 10 |
| 29 | 14 | 18 |
| 30 | 9 | 16 |
| 31 | 0 | 9 |
| 32 | 15 | 17 |
| 33 | 6 | 7 |
| 34 | 17 | 18 |
| 35 | 18 | 18 |
| 36 | 19 | 18 |

**21=85–100% control of all 7 weed species tested pre-emergence.
18=85–100% control of all 6 weed species tested post-emergence.

The compounds of the present invention are used as pre-emergence or post-emergence herbicides and are applied in a variety of ways at various concentrations. In practice, the compounds are formulated with an inert carrier, utilizing methods well-known to those skilled in the art, thereby making them suitable for application as dusts, sprays, or drenches and the like in the form and manner required. The mixtures can be dispersed in water with the aid of a wetting agent or they can be employed in organic liquid compositions, oil and water, water in oil emulsions, with or without the addition of wetting, dispersing or emulsifying agents. The amount applied depends upon the nature of the seeds or plants to be controlled and the rate of application varies from 1 to approximately 50 pounds per acre.

The phytotoxic compositions of this invention are applied to the plants in the conventional manner. Thus, the dust and liquid compositions can be applied to the plant by the use of power-dusters, boom and hand sprayers and spray-dusters. The compositions can also be applied from airplanes as a dust or a spray because they are effective in very low dosages. In order to modify or control growth of germinating seeds or emerging seedlings, as a typical example, the dust and liquid compositions are applied to the soil according to conventional methods and are preferably distributed in the soil to a depth of at least ½-inch below the soil surface. It is not necessary that the phytotoxic compositions be admixed with the soil particles and these compositions can be applied merely by spraying the sprinkling the surface of the soil. The phytotoxic compositions of this invention can also be applied by addition to irrigation water supplied to the field to be treated. This method of application permits the penetration of the compositions into the soil as the water is absorbed therein. Dust compositions, granular compositions or liquid formulations applied to the surface of the soil can be distributed below the surface of the coil by conventional means such as discing, dragging or mixing operations.

The phytotoxic compositions of this invention can also contain other additaments, for example fertilizers, pesticides and the like, used as adjuvants or in combination with any of the above-described adjuvants. Other phytotoxic compounds useful in combination with the above-described compounds include for example 2,4-dichlorophenoxyacetic acids, 2,4,5-trichlorophenoxyacetic acid, 2-methyl-4-chlorophenoxyacetic acid and the salts, esters and amides thereof; triazine derivatives, such as 2,4-bis(3-methoxypropylamino)-6-methylthio-S-triazine; 2-chloro-4-ethylamino-6-isopropylamino-S-triazine, and 2-ethylamino-4-isopropylamino-6-methylmercapto-S-triazine, urea derivatives, such as 3-(3,4-dichlorophenyl)-1,1-dimethyl urea and 3-(p-chlorophenyl)-1,1-dimethyl urea and acetamides such as N,N-diallyl-α-chloroacetamide, N-(α-chloroacetyl)hexamethylene imine, and N,N-diethyl-a-bromace-tamide, and the like; benzoic acids such as 3-amino-2,5-dichlorobenzoic, and; thiocarbamates, such as S-propyl dipropylthiocarbamate; S-ethyl-dipropylthiocarbamate, S-ethyl-cyclo-hexyl-ethyl-thiocarbamate, S-ethyl hexahydro-1H-azepine-1-carbothioate and the like. Fertilizers useful in combination with the active ingredients include for example ammonium nitrate, urea and superphosphate. Other useful additaments include materials in which plant organisms take root and grow such as compost, manure, humus, sand and the like.

The concentration of a compound of the present invention, constituting an effective amount in the best mode of administration in the utility disclosed is readily determinable by those skilled in the art. Various changes and modifications are possible without departing from the spirit and scope of the invention described herein and will be apparent to those skilled in the art to which it pertains. It is accordingly intended that the present invention shall only be limited by the scope of the claims.

What is claimed is:

[1. A compound having the formula

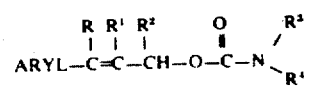

wherein ARYL is selected from the group consisting of phenyl, naphthyl, substituted phenyl and substituted naphthyl in which said substituents are selected from the group consisting of halogen, lower alkoxy, lower alkyl, and provided that when ARYL is substituted phenyl the substituent is also 3,4-oriented-methylenedioxy;

R and $R^1$ are independently selected from the group consisting of hydrogen, lower alkyl, chlorine and bromine;

$R^2$ is selected from the group consisting of hydrogen, lower alkyl and phenyl; and $R^3$ and $R^4$ are independently selected from the group consisting of hydrogen, alkyl, lower alkenyl, carbethoxymethyl, phenyl and substituted phenyl in which said substituents are selected from the group halogen, lower alkoxy, lower alkyl and nitro; provided that only one of $R^3$ or $R^4$ is phenyl or substituted phenyl; and further provided that when ARYL is phenyl then $R^3$ or $R^4$ is not phenyl.]

2. A compound [of claim 1] *having the formula*

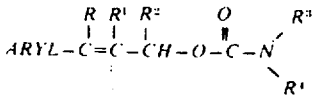

in which ARYL is mono-halophenyl, R and $R^1$, $R^2$ and $R^3$ are each hydrogen, and $R^4$ is alkyl.

3. A compound of claim 2 in which mono-halophenyl is o-chlorophenyl and $R^4$ is methyl.

4. A compound of claim 2 in which mono-halophenyl is p-chlorophenyl and $R^4$ is methyl.

5. A compound of claim 2 in which mono-halophenyl is m-chlorophenyl and $R^4$ is methyl.

6. A compound of claim 2 in which mono-halophenyl is o-bromophenyl and $R^4$ is methyl.

[7. A compound of claim 1 in which ARYL is phenyl, R, $R^1$, $R^2$ and $R^3$ are each hydrogen, and $R^4$ is alkyl.]

[8. A compound of claim 7 in which $R^4$ is methyl.]

[9. A compound of claim 7 in which $R^4$ is ethyl.]

[10. A compound of claim 7 in which $R^4$ is n-butyl.]

[11. A compound of claim 7 in which $R^4$ is n-octyl.]

[12. A compound of claim 7 in which $R^4$ is n-propyl.]

[13. A compound of claim 7 in which $R^4$ is i-propyl.]

[14. A compound of claim 1 in which ARYL is phenyl and R, $R^1$, $R^2$, $R^3$ and $R^4$ are each hydrogen.]

15. A compound [of claim 1] *having the formula*

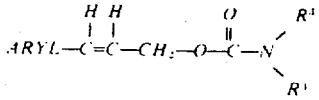

in which ARYL is mono-halophenyl, [R, $R^1$ and $R^2$ are each hydrogen,] $R^3$ and $R^4$ are each alkyl.

16. A compound of claim 15 in which ARYL is o-chlorophenyl, $R^3$ and $R^4$ are each methyl.

17. A compound [of claim 1] *having the formula*

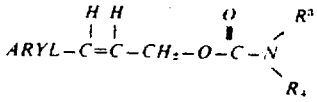

in which ARYL is phenyl, [R, $R^1$ and $R^2$ are each hydrogen] and $R^3$ and $R^4$ are each alkyl.

18. A compound of claim 17 in which $R^3$ and $R^4$ are each methyl.

19. A compound of claim 17 in which $R^3$ and $R^4$ are each ethyl.

20. A compound [of claim 1] *having the formula*

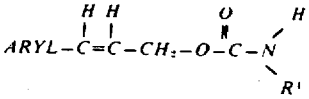

in which ARYL is phenyl [, R, $R^1$, $R^2$ and $R^3$ are each hydrogen,] and $R^4$ is lower alkenyl.

21. A compound of claim 20 in which $R^4$ is allyl.

* * * * *